G. P. WAHLE.
SIGNALING DEVICE.
APPLICATION FILED SEPT. 7, 1917.
1,276,459.
Patented Aug. 20, 1918.
2 SHEETS—SHEET 1.
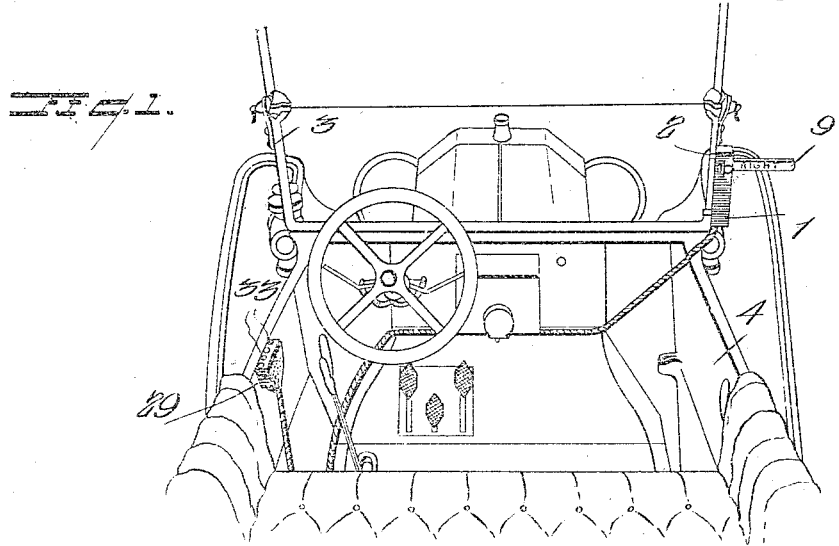
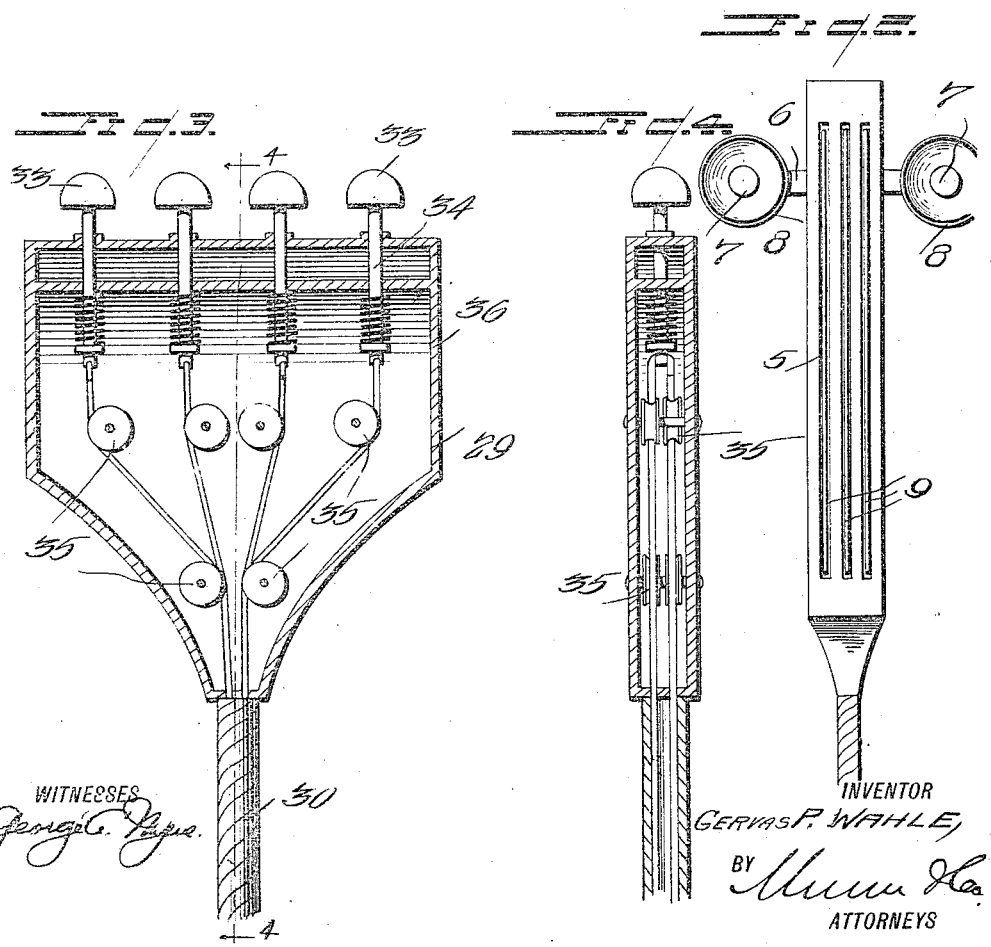
WITNESSES
INVENTOR
GERVAS P. WAHLE,
BY
ATTORNEYS G. P. WAHLE.
SIGNALING DEVICE.
APPLICATION FILED SEPT. 7, 1917.
1,276,459.
Patented Aug. 20, 1918.
2 SHEETS—SHEET 2.
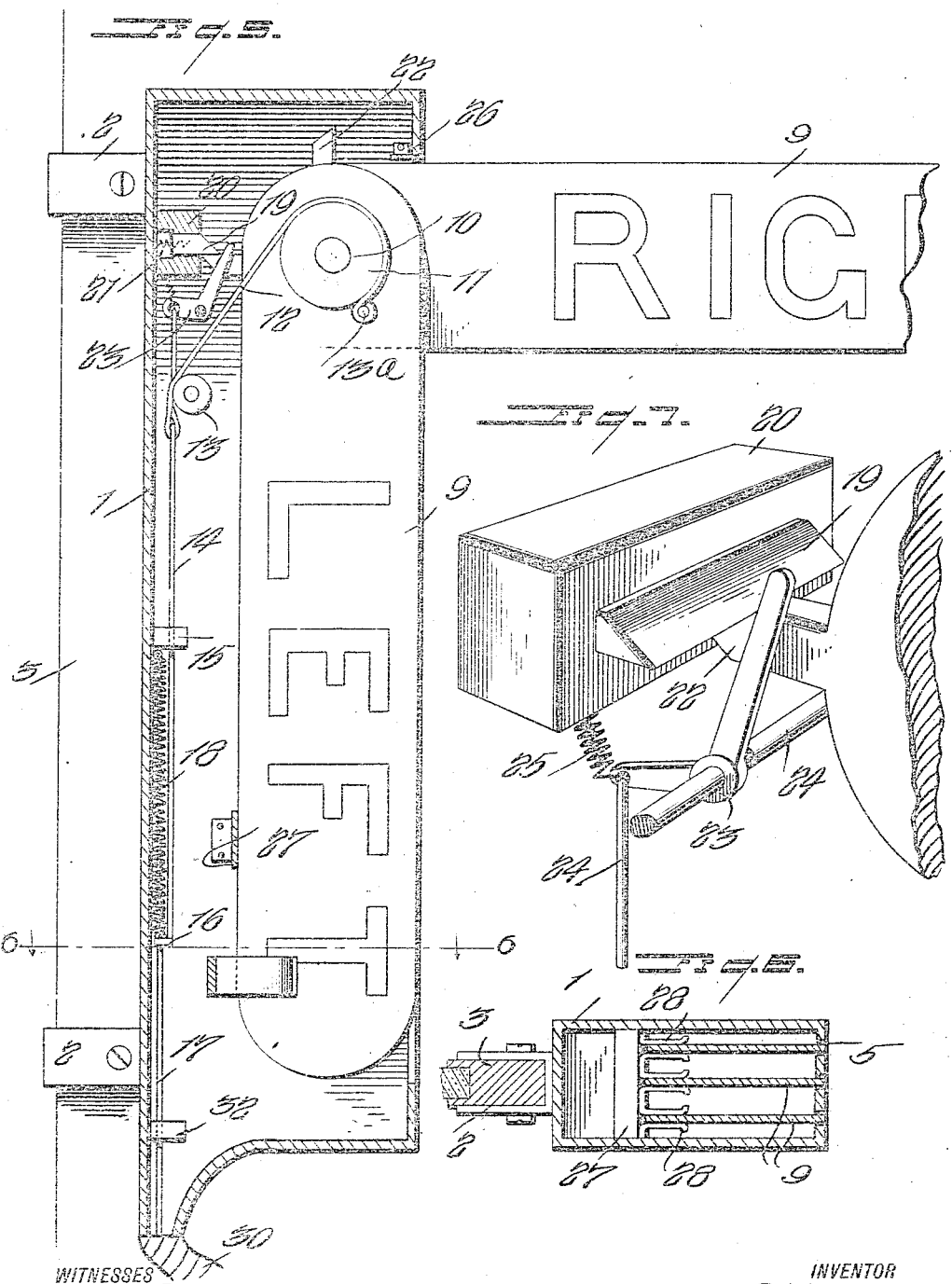
WITNESSES
INVENTOR
GERVAS P. WAHLE,
BY
ATTORNEYS

UNITED STATES PATENT OFFICE.

GERVAS PHILIP WAHLE, OF NEW ALBANY, INDIANA.

SIGNALING DEVICE.

1,276,459.

Specification of Letters Patent. Patented Aug. 20, 1918.

Application filed September 7, 1917. Serial No. 190,233.

*To all whom it may concern:*

Be it known that I, GERVAS PHILIP WAHLE, a citizen of the United States, and a resident of New Albany, in the county of Floyd and State of Indiana, have invented new and useful Improvements in Signaling Devices, of which the following is a specification.

My invention is an improvement in signaling devices, and has for its object to provide a device of the character specified especially adapted for use with motor vehicles, wherein a series of semaphore arms is provided, mounted to swing into and out of a supporting casing, the arms having means for swinging the same independently of each other, means being provided for holding the arms in operative position and a common releasing means being provided for all of the arms.

In the drawings:

Figure 1 is a perspective view of the front portion of a motor vehicle provided with the improved signaling device;

Fig. 2 is a side view of the device;

Fig. 3 is a sectional view of the controlling mechanism;

Fig. 4 is a section on the line 4—4 of Fig. 3, looking in the direction of the arrows adjacent the line;

Fig. 5 is a vertical section through the signal casing;

Fig. 6 is a section on the line 6—6 of Fig. 5, looking in the direction of the arrows adjacent the line;

Fig. 7 is a perspective view of the means for holding the signal arms in adjusted position and the common releasing arms.

In the present embodiment of the invention, a casing 1 is provided having clamps 2 at its top and bottom for permitting it to be secured to the frame 3 of the wind shield of a motor vehicle 4, and the casing is provided at its outer side wall with a series of vertical slots 5. Arms 6 extend forwardly and rearwardly from the casing near its upper end, and illuminating means 7, electric lights in the present instance, are supported by the arms, the said lights having the usual reflectors 8.

A series of semaphore arms 9 is mounted in the casing, the said arms being journaled on a shaft 10 near the upper end of the casing, and these arms 9 are mounted to swing into and out of the casing, through the slots 5. These arms bear legends as shown, one bearing the legend "Right," another "Left" and the other "Straight" or "Stop," as may be desired. A wheel or pulley 11 is secured to each arm at the shaft, and concentric with the shaft, and a flexible member 12 is provided in connection with each pulley. Each of these flexible members has one end secured to a pin 13 on the adjacent arm, and the flexible member passes over the pulley 11, and over a pulley 13 to a connection with a vertically movable rod 14. This rod is mounted to slide in a bearing 15 on the casing, and the lower end has an angle lug 16. A wire 17 is provided for operating each rod, each wire having its end passed through the lug 16 and provided with an eye to prevent disengagement from the rod. A coil spring 18 is arranged between each wire and the adjacent bearing 15 and normally acts to return the wire to normal position when the arm is lowered.

A cam bar 19 is mounted in a casing 20 secured to the inner wall of the casing 1 near its upper end, and this cam bar has its upper outer corner beveled, as shown. The bar is mounted to slide toward and from the inner wall of the casing 1 and is normally pressed outwardly by springs 21 which are arranged between the bar and the inner wall of the casing 1.

Each semaphore arm has a bevel lug 22 for coöperating with the cam bar, the lugs being arranged to push the cam bar inwardly when the semaphore arms are swung upwardly into operative position, and to swing beneath the cam bar to permit the cam bar to move outwardly under the influence of the springs 21 to lock the semaphore arm in rigid position.

A common release is provided for the arms, the release operating on the cam bar 21. The said release comprises a bell crank 23 which is secured to a shaft 24 journaled in the casing 1, and one of the arms of the bell crank is in position to engage the cam bar at its center, to press the cam bar into the casing 20 when the bell crank is swung. A rod 24 is connected with the other arm of the bell crank, the rod 24 being mounted in the same manner as the rods 14 and having connected therewith a controlling wire 17. A coil spring 25 is arranged between the arm of the bell crank to which the rod 24 is connected and the casing 20, the said spring acting normally to hold the parts in the inoperative position of Fig. 7.

Buffers 26 and 27 are provided in the casing for engagement by the arms at the end of their swinging movement in either direction, and spring clamps 28 are provided for holding the arms in lowered position. Each clamp consists of two leaves, between which the semaphore arm swings, and it will be noticed that the free ends of the levers are bent outwardly away from the arms.

The controlling mechanism for the semaphore arms is preferably arranged at the left of the driver in a casing 29, and a flexible tube 30 connects the casing 29 with the casing 1. The wires 17 pass through bearings 32 in the casing 1 and through the flexible tube to the casing 29, and each wire is connected with a button 32 mounted to slide in the casing, each button having a stem 34 which has guided movement in the casing. The wires are guided by direction elements 35 arranged within the casing, and it will be evident that by pulling on any particular button the semaphore arm connected thereto will be lifted into the operative position of Fig. 5.

A spring 36 is arranged between each rod 34 and the casing, acting normally to return the button to normal position. The semaphore arms are preferably differently colored, as, for instance, red for that arm bearing the legend "Right", yellow for the arm bearing the legend "Left" and white for that arm bearing the legend "Straight." The buttons are colored to correspond with the semaphore arms, and that button connected with the common release for the arms may be colored black.

In operation, the semaphore arms normally hold a position within the casing, being so held by the clamps 28. If the driver, for instance, wishes to turn to the right he should pull that button corresponding to the semaphore arm bearing the legend "Right." The arms will swing outwardly and upwardly into the position of Fig. 5, and the lug 22 will lock beneath the cam bar 19. After the driver turns to the right he may throw up that arm bearing the legend "Straight", and the swinging upwardly of the arm will release the arm bearing the legend "Right", permitting it to drop, that is, each arm, when swung up into operative position, releases all the other arms.

I claim:

A device of the character specified comprising a casing, a series of signal arms pivoted on a common axis near the top of the casing and mounted to swing into and out of the casing, each arm having at its upper end a longitudinally extending lug, a locking bar in rear of the pivotal connection of the arms and normally spring pressed toward the said connection, the bar and the lugs having beveled coöperating surfaces for moving the bar rearwardly when an arm is lifted and for releasing the lifted arm when another arm is moved into operative position, means for swinging any predetermined arm, and independent means for releasing the locking bar, said independent means comprising an elbow lever having one arm in position to engage the bar, a flexible member connected with the other arm, and a spring normally holding the lever in inoperative position.

GERVAS PHILIP WAHLE.

Witnesses:
GEORGE A. NEWHOUSE,
ADDISON R. RUE.